(12) United States Patent
Pahl et al.

(10) Patent No.: US 7,152,745 B2
(45) Date of Patent: Dec. 26, 2006

(54) FILTER BYPASS MONITORING SYSTEM

(75) Inventors: Brian W. Pahl, Louisville, KY (US); Frank M. Croket, Louisville, KY (US); Richard L. Duncum, Lakeside Marblehead, OH (US)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 462 days.

(21) Appl. No.: 10/380,276

(22) PCT Filed: Sep. 17, 2001

(86) PCT No.: PCT/US01/28878

§ 371 (c)(1),
(2), (4) Date: Aug. 12, 2003

(87) PCT Pub. No.: WO02/22231

PCT Pub. Date: Mar. 21, 2002

(65) Prior Publication Data

US 2004/0035767 A1 Feb. 26, 2004

(51) Int. Cl.
*B01D 33/056* (2006.01)
(52) U.S. Cl. .................. 210/387; 210/400; 210/401
(58) Field of Classification Search ............... 210/783, 210/400, 401, 387, 90
See application file for complete search history.

(56) References Cited

U.S. PATENT DOCUMENTS

| 2,867,324 A | 1/1959 | Hirs |
| 3,899,426 A | 8/1975 | Hirs |
| 4,390,428 A | 6/1983 | Bratten |
| 5,089,143 A | 2/1992 | Anderson |
| 5,449,455 A | 9/1995 | Womack |

*Primary Examiner*—Thomas M. Lithgow
(74) *Attorney, Agent, or Firm*—Crowell & Moring LLP

(57) ABSTRACT

A method and apparatus for sealing the opposed side edges of a fluid treating belt filter (3) by employing an inflatable elastic tube (18). Opposed sealing surfaces are spaced apart from each other defining a gap there between which can be brought into sealing relationship by activation of the tube (18). The tube (18) being tested prior to and during sealing. Fluid that bypasses the seal are collected for rycycle.

25 Claims, 4 Drawing Sheets

FILTER BYPASS MONITORING SYSTEM

BACKGROUND OF THE INVENTION

This invention relates to filter systems and more particularly to a fluid filter bypass monitoring system which, during both filtering and filter regenerating operations, assists in proper sealing between dirty and clean fluid sides of the system and, at the same time, assists in recovering residual fluid filtering materials.

It is known in the filtration art to use various types of arrangements to seal the lateral edges of longitudinally advancable filter media. Examples include relying on the weight of drive chains to urge the filter media against support members as disclosed in Hirs, U.S. Pat. No. 3,087,620 and Anderson, U.S. Pat. No. 5,008,007; using resilient sealing strips as disclosed in Hindi, U.S. Pat. No. 3,358,834; special vacuum box sealing members as disclosed in Ishigaki, U.S. Pat. No. 3,677,411; dam members on the undersides of the filter media which interact with underlying shelf members as disclosed in Lee, U.S. Pat. No. 4,220,539, and even inflatable seal tubes as disclosed in Bratten, U.S. Pat. No. 5,601,729. Each of the aforementioned seal techniques has disadvantages. Particularly the use of inflatable seal tubes is subject to failure if the tubes leak or burst.

It is also known to provide inflatable seals to seal space between adjacent parallel surfaces and to test the effectiveness of the seal by measuring pressure in chambers formed between the seal and the sealed interfaces. Examples of such seals are disclosed in Godfrey, U.S. Pat. No. 4,214,760 and Brooking, U.S. Pat. No. 4,908,179. In both of these patents, the testing mechanism accomplishes testing when the surfaces to be sealed are in sealed position, the testing being accomplished by a comparatively complex series of alternatively spaced test probes passing through an enlarged upper end of a flexible seal above the inflatable portion of such flexible seal, the distal ends of the probes extending through each flexible seal into a chamber which is formed between the flexible seal and the members to be sealed so as to measure pressure in such formed chamber. Not only is such an arrangement comparatively complex and costly in construction, operation and maintenance, but in addition, the testing measurement function is of questionable value since it punctures a portion of the flexible seal material and testing is accomplished upon actual sealing rather than prior to such sealing.

Despite the efforts of the prior art, there has remained a need for reliable measures to prevent dirty liquid from circumventing the lateral edges of a longitudinally movable, elongated filter medium and entering a clean filtrate chamber.

SUMMARY OF THE INVENTION

In the present invention, an economical and straightforward structural sealing, arrangement is provided which is comparatively more efficient in construction, maintenance and operation, the inventive sealing arrangement requiring a minimum of parts in the novel apparatus and a minimum of steps in the novel method. Further, the present invention, recognizing the possibilities of fluid leakage during sealing operations and the possibilities of the presence of residual fluids during seal open regenerating operations, provides a unique and straightforward fluid and particulate capture arrangement so as to accommodate for such possible contingencies. The novel capture arrangement, like the above discussed sealing arrangement, also requires a minimum of parts in the apparatus and a minimum of steps in the method.

In accordance with a first aspect of the invention, an filtering apparatus is provided having opposed lateral walls and comprising a receiving tank for dirty liquid to be filtered; an adjacent filtrate chamber for filtered liquid; and a longitudinally movable filter medium interposed between the receiving tank and the filtrate chamber such that liquid can flow from the receiving tank through the filter medium, whereby the liquid is filtered, and into the filtrate chamber; the filter medium having opposed lateral edges extending longitudinally along the lateral walls of the filter apparatus; selectively actuatable seal members extending along the lateral edges of the filter medium for sealing the lateral edges against leakage during filtering operations; the seal members being deactuatable to release the filter medium to enable the filter medium when loaded with filtered solids to be moved longitudinally to interpose a fresh section of the filter medium between the receiving tank and the filtrate chamber; and a leakage collector disposed under the lateral edges of the filter medium for capturing any dirty liquid which leaks through the seal members when actuated or which is released when the seal members are deactuated to permit longitudinal movement of the filter medium.

In further aspect of the invention, a filtering apparatus is provided having opposed lateral walls and comprising a receiving tank for dirty liquid to be filtered; an adjacent filtrate chamber for filtered liquid; and a longitudinally movable filter medium interposed between the receiving tank and the filtrate chamber such that liquid can flow from the receiving tank through the filter medium, whereby the liquid is filtered, and into the filtrate chamber; the filter medium having opposed lateral edges extending longitudinally along the lateral walls of the filter apparatus; selectively actuatable seal members extending along the lateral edges of the filter medium for sealing the lateral edges against leakage during filtering operations; the seal members comprising opposed members on opposite sides of the lateral edges of the filter medium, and at least one of the members being movable toward or away from the other member, and the seal members being deactuatable to release the filter medium to enable the filter medium when loaded with filtered solids to be moved longitudinally to interpose a fresh section of the filter medium between the receiving tank and the filtrate chamber; and a restoring spring for urging the at least one movable member away from the other member.

In yet another aspect of the invention, a filtering apparatus is provided having opposed lateral walls and comprising a receiving tank for dirty liquid to be filtered; an adjacent filtrate chamber for filtered liquid; and a longitudinally movable filter medium interposed between the receiving tank and the filtrate chamber such that liquid can flow from the receiving tank through the filter medium, whereby the liquid is filtered, and into the filtrate chamber; the filter medium having opposed lateral edges extending longitudinally along the lateral walls of the filter apparatus; selectively actuatable seal members extending along the lateral edges of the filter medium for sealing the lateral edges against leakage during filtering operations; the seal members being deactuatable to release the filter medium to enable the filter medium when loaded with filtered solids to be moved longitudinally to interpose a fresh section of the filter medium between the receiving tank and the filtrate chamber; an actuator comprising an inflatable and deflatable tube for actuating the seal members, and a pressure sensor or pressure indicator for monitoring the pressure in the inflatable and deflatable tube.

It is also an aspect of the invention to provide a method of filtering particulate matter from a particulate laden liquid stream comprising passing the particulate laden liquid stream through a filtering zone including a particulate laden liquid inlet and a clean liquid outlet with a movable, elongated filter medium having opposed side edges interposed between the inlet and the outlet; selectively actuating sealing members positioned along the opposed side edges of the elongated the filter medium to a closed sealing position during filter operation and deactuating the seal member to an open position when the filter medium becomes loaded with filtered particles and it is necessary to renew the filtering capability of the apparatus, thereby releasing the filter medium for longitudinal movement; longitudinally moving the filter medium to position a fresh section thereof between the dirty liquid receiving tank and the clean filtrate chamber; thereafter actuating the sealing members to reclose the sealing members and re-commencing filtering operations, and monitoring the performance of the sealing members.

Various other features of the present invention will become apparent to one skilled in the art upon reading the disclosure set forth herein.

More particularly, the present invention provides a fluid filter apparatus comprising fluid receiving tank means having opposed side walls, the tank means including a first tank section to receive a dirty fluid to be filtered and a successive second tank section to receive clean fluid after it has been filtered longitudinally extending porous filter means having opposed longitudinally extending side edges, the filter means being intermittently moveable between filtering and regenerating operations in a plane between the first and second tank sections, the filter means being adapted to separate out particulate matter during a filtering operation from the dirty fluid passing from the first tank section to the second tank section; sealing means to seal the opposite side edges of the filter means between the first and second tank sections during the filtering operations, the sealing means including pairs of first and second opposed sealing members positioned on opposite faces of the side edges of the filter means, at least one of the sealing members of each pair being moveable relative the other sealing member; an actuating member to activate relative movement of each of the opposed sealing member pairs to sealed position during filtering operations and to a bypass open position during intermittent movement of the filter means for regenerating operations; a bypass monitoring system including verification means to verify operability of the actuating member prior to positive movement of the actuating member to sealing position for filtering operations; and residual fluid and particulate capture means to capture residual fluid and particulate matter due to possible leakage during sealed filtering operations and during open regenerating operations.

In addition, the present invention provides a method of filtering particulate matter from a particulate laden fluid stream comprising passing a particulate laden fluid stream through a filtering zone including a particulate laden fluid stream inlet and a clean fluid stream outlet with opposed side edges of a filtering member extending between the particulate laden fluid inlet and the clean fluid outlet; selectively activating sealing members to closed sealing position and regeneratively open position along the opposed side edges of a filtering member during fluid treating and regenerative steps, respectively; verifying the activating sealing step during the open regenerative step when fluid treating operations cease; and capturing residual fluid and particulates from the sealing and regenerative steps.

It is to be understood that various changes can be made by one skilled in the art in one or more of the several parts and in one or more of the several steps of the inventive apparatus and method, respectively, disclosed herein without departing from the scope or spirit of the present invention.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
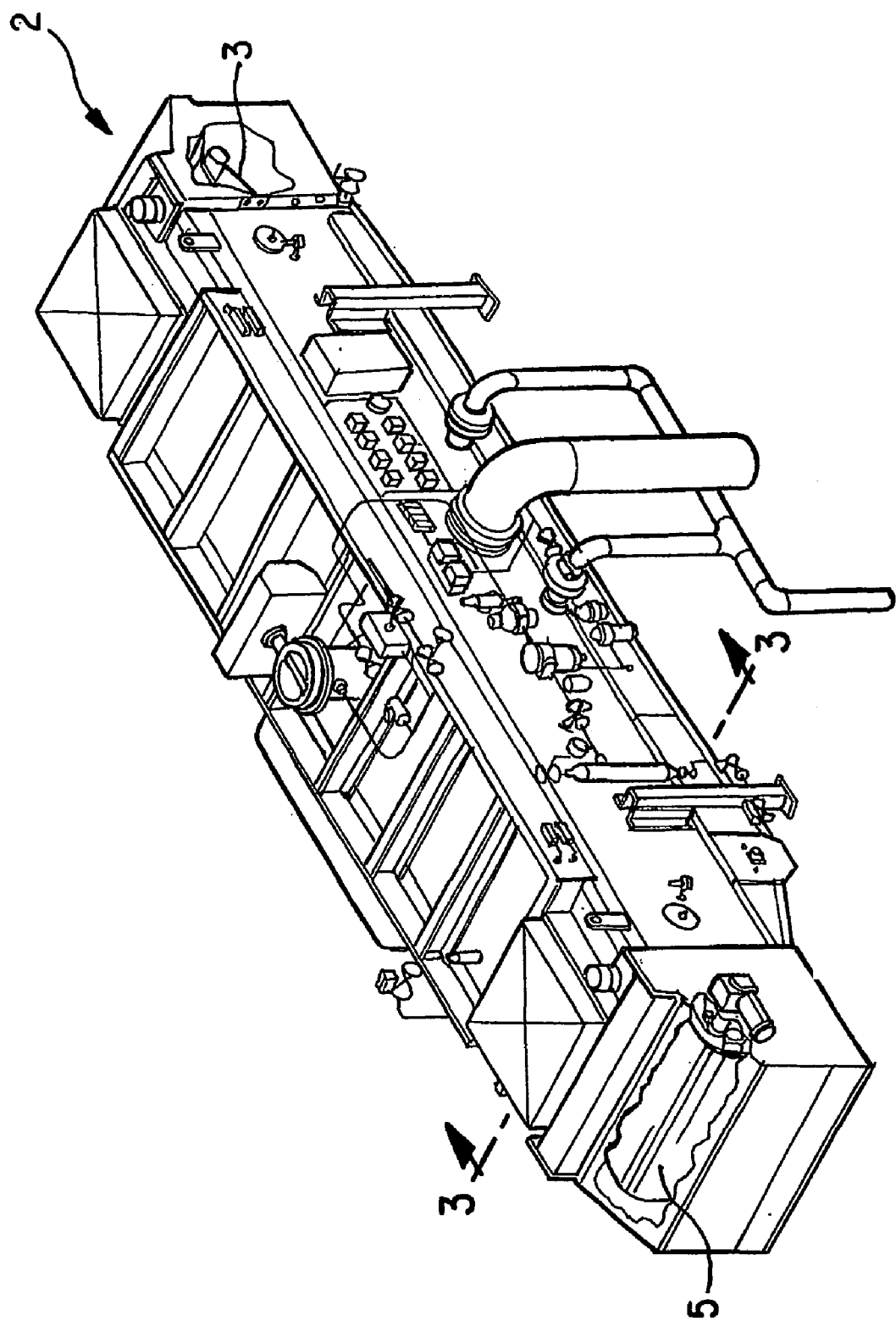
FIG. 1 is an isometric partially broken away view of a pressure filter to schematically illustrate applicable portions of the present invention.
Figure 2:
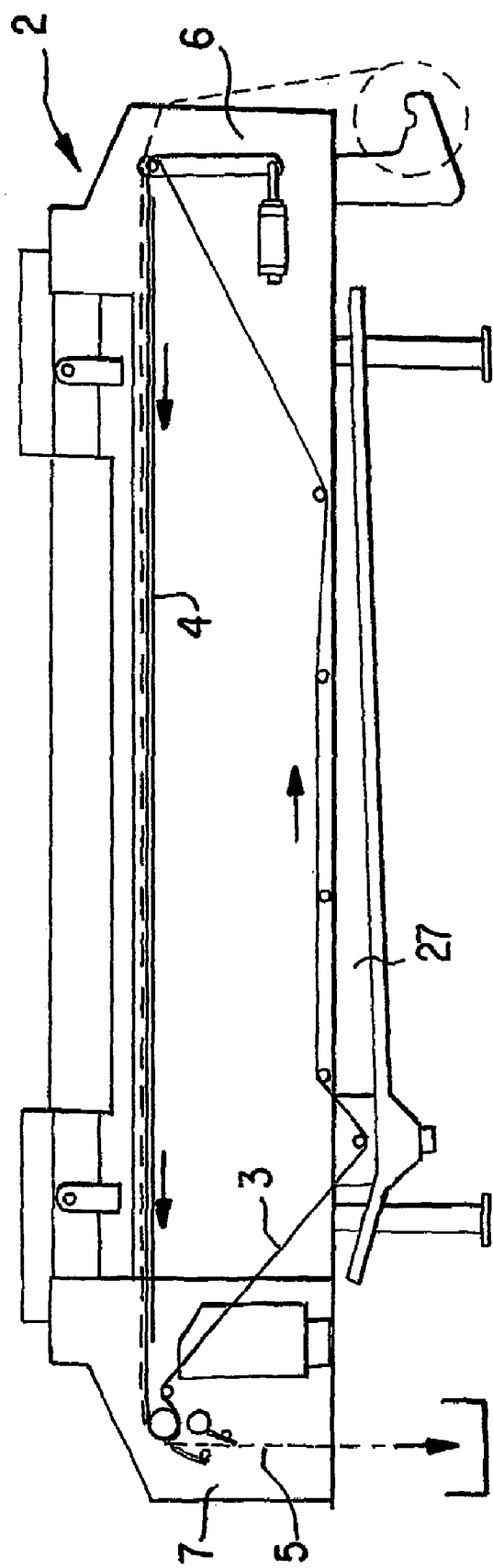
FIG. 2 is a schematic side view of the pressure filter of FIG. 1, disclosing separately driven permanent and disposable filter belts.

Referring to the drawings, FIGS. 1 and 2 disclose a partially broken way automatic belt type pressure filter 2 which incorporates the features of the invention. It is to be understood that the inventive features disclosed herein are not to be considered as limited to the disclosed pressure filter of FIGS. 1 and 2 but that the features can be employed with other sealing arrangements where fluid passage and sealing are involved.

As can be seen in the pressure filter apparatus 2 disclosed in FIGS. 1 and 2, the filter housing includes independently and synchronously driven longitudinally extending, endless, permanent, filter belt 3 and disposable filter belt 5 mounted above a fixed longitudinally extending fluid pervious foraminous structural support plate 4. The filter belts 3 and 5 are synchronously moved along fluid pervious fixed plate 4, with disposable filter material 5 being unwound from a supply source 6 and conveyed to a disposal container at end 7 of apparatus 2. Although both permanent and disposable belts 3 and 5 are disclosed, it is to be understood that fluid filter may alternatively comprise only a disposable filter medium 5, or only a permanent filter medium 3. Either or both filter medium types (i.e., disposable belt 5 and/or permanent belt 3) is intermittently moveable when loaded with filtered particles so as to be capable of moving clean fluid treating filter media into the fluid stream to be treated whenever needed in order to maintain the filtering capacity of the apparatus.

Figure 3:
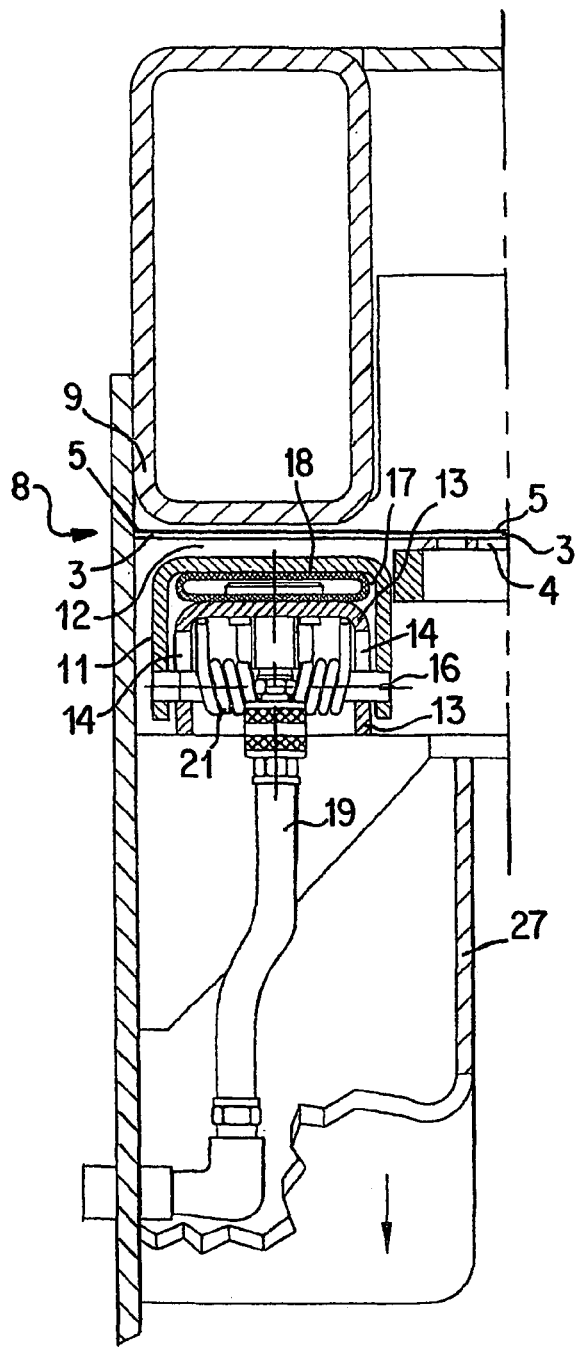
FIG. 3 is an enlarged cross-sectional partial view of one embodiment of the present invention, taken along line 3—3 of FIG. 1.

FIG. 3 of the drawings shows only one filter media belt lateral edge sealing arrangement 8, but it is to be understood that a similar mirror image sealing arrangement 8 can be employed along the opposite lateral edge of a filter belt.

The sealing arrangement 8 disclosed includes a pair of aligned longitudinally extending and facing sealing members 9 and 11 defining a longitudinally extending gap 12 therebetween along which the longitudinal side edge of filter belt travels. The upper sealing member 9, as shown, is static, and the lower sealing member 11 is moveable so as to sealingly close gap 12 and thereby seal the lateral edge of the filter medium 3, 5 therebetween. It is to be understood that it would also be possible, if desired, to reverse the static-moveable sealing arrangement and have the fixed member 9 on the bottom and movable member 11 on the top, or even to have both cooperating sealing members moveable toward and away from each other.

In the embodiment of FIG. 3, lower sealing member 11 is of channel form, having a U-shaped cross-section, and as an outer channel member, surmounts another, smaller, fixed, inner channel member 13, also having a U-shaped cross-section, with the opposed side legs of channel member 13 including spaced, opposed aligned slots 14 through which the opposite extremities of a pin 16 extend to be secured to the opposite side legs of moveable lower surmounting outer sealing member 11. Thus, outer sealing member 11 is not only moveable relative upper fixed sealing member 9 but it also is moveable relative the surmounted smaller fixed inner channel member 13. Due to the relative sizing of the cooperating lower, super-mounted, moveable and fixed channel members 11 and 13, a longitudinally extending chamber 17 is formed between upper base surface of channel member 13 and the lower or inner base surface of channel member 11. This chamber 17 serves to accommodate elongated, hollow, elastic tube 18 therein, so that the hollow tube 18 is between lower moveable channel member 11 and lower fixed channel member 13. The defined chamber for hollow elastic tube 18 is connected to fluid pneumatic or hydraulic source represented by air line 19 through a suitable valve arrangement so that tube 18 can be inflated to move channel member 11 toward fixed member 9 and/or deflated to allow channel member 11 to retract away from fixed member 9.

Disposed within the lower inner fixed channel member 13 in surrounding relation to pin 16 is a helical coil spring 21 with the extremities thereof abutting the inner face of the base leg of the outer moveable lower channel member 11. Accordingly, when hollow tubing 18 is inflated, advantageously by air (pneumatically) through air line 19, moveable, lower, outer channel member 11 is moved against the force of spring 21 into sealing relation against the fixed upper member 9, with the lateral edges of filter belts 3 and 5 extending into longitudinally extending gap 12 between the opposed sealing members 9 and 11, thereby sealing gap 12 and the lateral edges of filter belts 3 and 5 between fixed sealing member 9 and moveable channel member 11. When the filter media 3 and 5 become loaded with filtered solids so that the rate of filtration decreases to an unacceptable level, as indicated by an increase in the pressure drop across the filter media, hollow elastic tubes 18 are deflated by releasing the fluid pressure in the tubes 18 by switching valves 22, schematically shown in FIG. 5. Spring 21 acts to move the moveable sealing channel member 11 away from fixed member 9, thereby opening gap 12, deflating tube 18, and releasing filter belts 3 and 5. Once belts 3 and 5 are released from betwen the seal members 9 and 11, the filter media can be advanced to position a fresh section of the filter medium between the receiving tank and the filtrate chamber. The seals are then re-closed, and filtration can begin anew.

Figure 5:
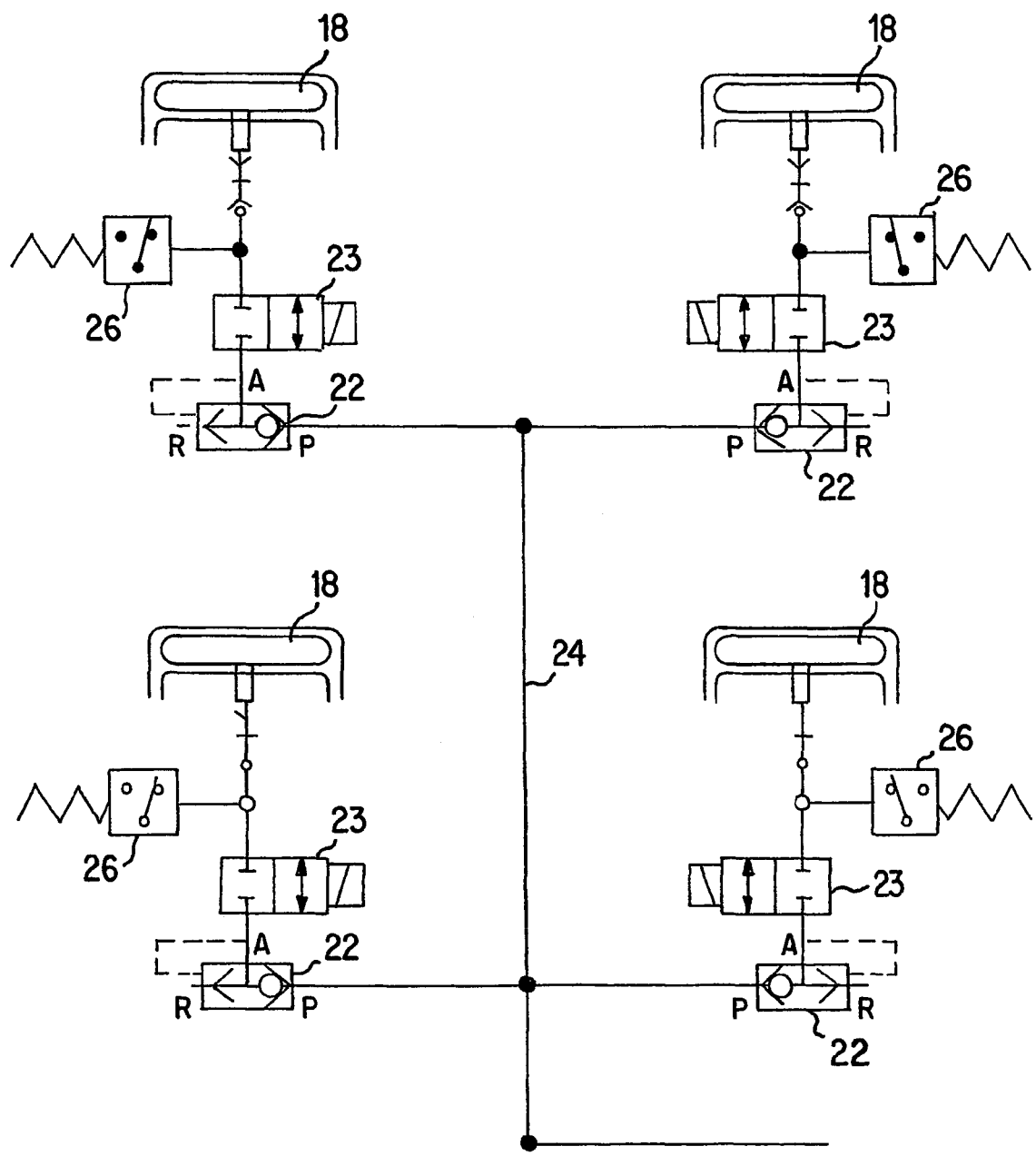
FIG. 5 is a schematic representation of the seal monitoring arrangement for the filter arranngement of the present invention.

Referring to the schematic diagram of FIG. 5 of the drawings, when gap 12 is in open position, the four hollow elastic tubes 18 which are disclosed are deflated. It is to be noted that in the embodiment disclosed in FIG. 5, four inflatable tubes 18 in oppositely spaced aligned pairs of two are employed along the opposed side edges of filter belts 3 and 5; however, it is to be understood that other tubing arrangements can be used. In the schematic arrangement of FIG. 5, a reversible ball and solenoid valve 22, 23 is shown for each hollow elastic tube 18. Each valve 22 is responsive to the operation of a solenoid 23. The system of FIG. 5 is responsive to the intermittent movement of filter belts 3 and 5 with gap 12 opened accordingly to allow testing air to be introduced through line 24 into a hollow tube 18 so as to determine measurable pressure in tube 18 through pressure sensors or indicators 26. With this arrangement, it is thus possible to determine by pressure indicators 26 whether there is any leakage in seal actuating hollow tubes 18 and whether sealing throughout can be appropriately relied upon. Also, if a sealing tube fails when the seal members 9, 11 are closed during a filtering operation, the pressure sensor or indicator 26 will show it and can be immediately used to actuate an alarm and/or shut down the filter apparatus before dirty liquid can penetrate to the filtrate chamber.

Referring again to FIGS. 2 and 3 of the drawings, it can be seen that as another feature of the invention, gravity flow, inclined tank members 27 can be positioned below opposed longitudinally extending filter edges to capture any residual liquid and particulate matter that might enter gap 12 during gap opening for appropriate recycle and disposal.

Figure 4:
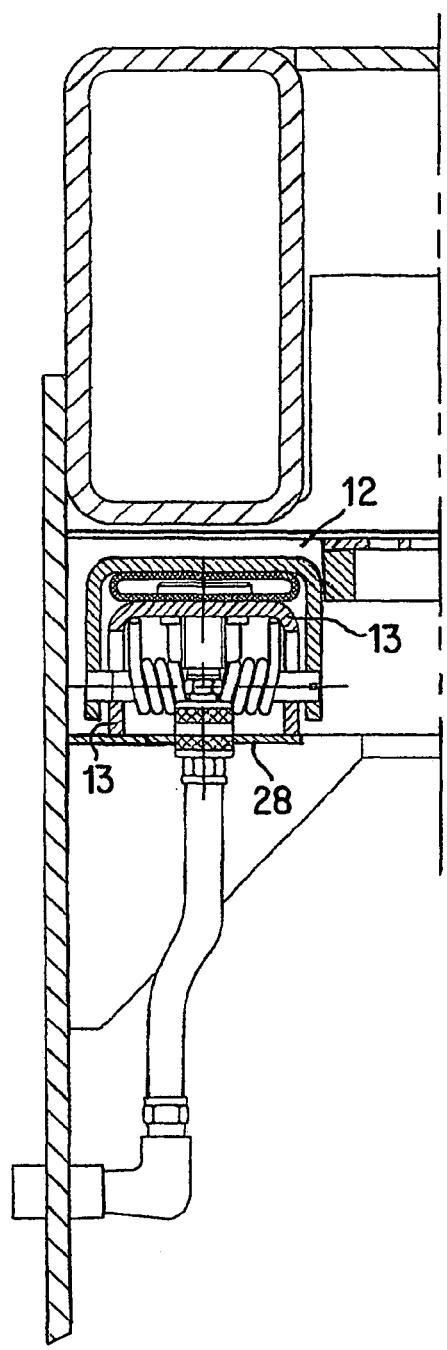
FIG. 4 is an enlarged cross-sectional view similar to that of FIG. 3, disclosing a modified embodiment of the present invention.

Alternatively, plate members 28 can be installed as shown in FIG. 4 along lower seal members 11, 13. Plate members 28 form a collecting chamber between the lower seal member and the sidewall of the filter apparatus. These chambers catch and retain any dirty liquid which either leaks through the seal when the seal is closed or which passes through the seal when the seal is opened and prevent such dirty liquid from entering the clean filtrate chamber. Particulate laden dirty liquid captured by these collecting chambers can be purged with compressed air or flushed out with a liquid stream and recycled or disposed of, as appropriate.

In accordance with still another aspect of the present invention, a method of filtering particulate matter from a particulate laden liquid stream is provided comprising the steps of passing the particulate laden liquid stream through a filtering zone including a particulate laden liquid inlet and a clean liquid outlet with an movable, elongated filter medium having opposed side edges interposed between the inlet and the outlet; selectively actuating sealing members positioned along the opposed side edges of the elongated the filter medium to a closed sealing position during filter operation and deactuating the seal member to an open position when the filter medium becomes loaded with filtered particles and it is necessary to renew the filtering capability of the apparatus, thereby releasing the filter medium for longitudinal movement; longitudinally moving the filter medium to positioning a fresh section thereof between the dirty liquid receiving tank and the clean filtrate chamber; thereafter actuating the sealing members to reclose the sealing members and re-commencing filtering operations, and monitoring the performance of the sealing members.

In preferred embodiments of the filtering method, the sealing members are actuated by inflating a tubular actuator, and the performance of the sealing members is monitored by monitoring the pressure in the tubular actuator with a pressure sensor, gauge or indicator. Failure of the tubular actuator during operation will be indicated by a rapid decrease in pressure. It is also possible by shutting off the air supply to the tubular actuator and then monitoring the pressure in the tube, to detect even pinhole leaks which could develop into a later catastrophic failure of the tube. In this way, tubular actuators which are in danger of failing can be identified and replaced during regular maintenance intervals of the filtering apparatus, thereby avoiding catastrophic failures which could require an emergency shut-down of the filtering apparatus and consequent interruption of plant operations.

Another preferred embodiment of the method of the invention involves capturing any dirty liquid which may leak through the seal when closed or which may pass through the seal when it is opened to permit advancement of the filter media to regenerate the filtering capacity of the apparatus. As noted above, this may be achieved by use of a collecting trough 27 positioned underneath the seal members, or by means of a seal plate 28 which prevents dirty liquid from flowing past the seal members into the clean filtrate chamber. Captured or collected residual dirty liquid may then be recycled to filtration or disposed of, as appropriate.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A liquid filter apparatus having opposed lateral walls and comprising a receiving tank for dirty liquid to be filtered; an adjacent filtrate chamber for filtered liquid; and a longitudinally movable filter medium interposed between said receiving tank and said filtrate chamber such that liquid can flow from said receiving tank through the filter medium, whereby the liquid is filtered, and into the filtrate chamber; said filter medium having opposed lateral edges extending longitudinally along the lateral walls of the filter apparatus; selectively actuatable seal members extending along the lateral edges of said filter medium for sealing said lateral edges against leakage during filtering operations; said seal members being deactuatable to release said filter medium to enable the filter medium when loaded with filtered solids to be moved longitudinally to interpose a fresh section of the filter medium between said receiving tank and said filtrate chamber; and a leakage collector disposed under the lateral edges of the filter medium for capturing any dirty liquid which leaks through the seal members when actuated or which is released when the seal members are deactuated to permit longitudinal movement of the filter medium, wherein said seal members comprise opposed members on opposite sides of the lateral edges of said filter medium, at least one of said members being movable toward or away from the other member, and wherein the movable seal member comprises a fixed, first U-shaped channel member having elongated slots in legs thereof, a second, movable channel member arranged partially surrounding said first channel member such that legs of said second channel member are positioned outside and laterally adjacent the legs of the first channel member and an actuator compartment is formed between the first and second channel members, at least one pin member extending from the legs of the second channel member through the slots in the first channel member, and an actuator in said actuator compartment which when actuated urges second channel member toward the other seal member.

2. A liquid filter according to claim 1, wherein said actuator comprised a selectively inflatable and deflatable tube.

3. A liquid filter according to claim 1, further comprising a restoring spring for urging said at least one movable member away from the other member.

4. A liquid filter according to claim 1, wherein said leakage collector comprises a collecting trough extending along a lateral wall of said apparatus underneath the seal members.

5. A liquid filter according to claim 4, wherein said collecting trough is an inclined, gravity flow trough.

6. A liquid filter according to claim 1, wherein said leakage collector comprises a plate extending between a lower seal member and a lateral wall of said apparatus, said plate forming a collecting chamber between said lateral wall and said lower seal member which catches and retains any dirty liquid which leaks through said seal members when actuated or which circumvents a lateral edge of said filter medium underneath a lower seal member when the seal members are deactuated.

7. A liquid filter according to claim 1, wherein said longitudinally movable filter medium comprises an endless belt of permanent filter material.

8. A liquid filter according to claim 1, wherein said longitudinally movable filter medium comprises an elongated strip of disposable filter material fed from a supply roll at one end of the apparatus and collected in a disposal chamber at the other end of the apparatus.

9. A liquid filter according to claim 1, wherein said longitudinally movable filter medium comprises an endless belt of permanent filter material and a superposed strip of disposable filter material fed from a supply roll at one end of the apparatus and collected at in a disposal chamber at the other end of the apparatus.

10. A liquid filter according to claim 1, wherein said filter material is supported on an underlying foraminous plate.

11. A liquid filter according to claim 1, wherein said seal members are actuated by an actuating device comprising an inflatable tube.

12. A liquid filter according to claim 11, wherein said tube is selectively inflatable to actuate the sealing members and deflatable to deactuate the sealing members.

13. A liquid filter according to claim 12, wherein said tube is inflated and deflated by means of a reversible ball and solenoid valve.

14. A liquid filter according to claim 12, further comprising a pressure sensor or pressure indicator for monitoring the pressure in said tube.

15. A liquid filter according to claim 12, further comprising a deflating mechanism for automatically deflating said tube when pressure in said tube is released.

16. A liquid filter according to claim 15, wherein said deflating mechanism comprises a movable seal member disposed adjacent said tube and a restoring spring which urges said movable seal member against said tube.

17. A liquid filter according to claim 2, further comprising a restoring spring which urges the first and second channel members together, said spring forcibly deflating said tube when a valve on an inflation line is opened to release pressure from the tube.

18. A liquid filter apparatus having opposed lateral walls and comprising a receiving tank for dirty liquid to be filtered; an adjacent filtrate chamber for filtered liquid; and a longitudinally movable filter medium interposed between said receiving tank and said filtrate chamber such that liquid can flow from said receiving tank through the filter medium, whereby the liquid is filtered, and into the filtrate chamber; said filter medium having opposed lateral edges extending longitudinally along the lateral walls of the filter apparatus;

selectively actuatable seal members extending along the lateral edges of said filter medium for sealing said lateral edges against leakage during filtering operations; said seal members comprising opposed members on opposite sides of the lateral edges of said filter medium, and at least one of said members being movable toward or away from the other member, and said seal members being deactuatable to release said filter medium to enable the filter medium when loaded with filtered solids to be moved longitudinally to interpose a fresh section of the filter medium between said receiving tank and said filtrate chamber, the movable member including a fixed U-shaped channel member having legs, and a movable U-shaped channel member arranged partially surrounding said fixed channel member such that legs of said movable channel member are positioned outside and laterally adjacent the legs of the fixed channel member so that the fixed channel member provides lateral support to the movable channel member; and a restoring spring for urging the at least one movable member away from the other member.

19. A liquid filter according to claim 18, wherein said apparatus further includes a leakage collector comprising a plate extending between a lower seal member and a lateral wall of said apparatus, said plate forming a collecting chamber between said lateral wall and said lower seal member which catches and retains any dirty liquid which leaks through said seal members when actuated or which circumvents a lateral edge of said filter medium underneath a lower seal member when the seal members are deacutated.

20. A liquid filter according to claim 18, wherein said longitudinally movable filter medium comprises an endless belt of permanent filter material.

21. A liquid filter according to claim 18, wherein said longitudinally movable filter medium comprises an elongated strip of disposable filter material fed from a supply roll at one end of the apparatus and collected in a disposal chamber at the other end of the apparatus.

22. A liquid filter according to claim 18, wherein said longitudinally movable filter medium comprises an endless belt of permanent filter material and a superposed strip of disposable filter material fed from a supply roll at one end of the apparatus and collected at in a disposal chamber at the other end of the apparatus.

23. A liquid filter according to claim 18, wherein said filter material is supported on an underlying foraminous plate.

24. A liquid filter according to claim 18, wherein said seal members are actuated by an actuating device comprising an inflatable tube.

25. A liquid filter according to claim 24, wherein said tube is selectively inflatable to actuate the sealing members and deflatable to deactuate the sealing members.

* * * * *